(12) United States Patent
Bulgrien

(10) Patent No.: US 7,846,063 B2
(45) Date of Patent: Dec. 7, 2010

(54) AUTOMATIC CALIBRATION OF A TORQUE MEASURING SYSTEM

(75) Inventor: Garth H. Bulgrien, Ephrata, PA (US)

(73) Assignee: CNH America LLC, New Holland, PA (US)

( * ) Notice: Subject to any disclaimer, the term of this patent is extended or adjusted under 35 U.S.C. 154(b) by 561 days.

(21) Appl. No.: 11/998,292

(22) Filed: Nov. 29, 2007

(65) Prior Publication Data

US 2009/0139320 A1   Jun. 4, 2009

(51) Int. Cl.
  *F16H 59/14*   (2006.01)
(52) U.S. Cl. ...................... 477/115; 477/902
(58) Field of Classification Search .................. 477/902
  See application file for complete search history.

(56) References Cited

U.S. PATENT DOCUMENTS

| | | | |
|---|---|---|---|
| 3,657,926 A | 4/1972 | Munson et al. ............... | 73/404 |
| 3,693,426 A | 9/1972 | Little .......................... | 73/133 |
| 3,797,305 A | 3/1974 | Haskell ........................ | 73/136 |
| 4,129,034 A | 12/1978 | Niles et al. .................. | 73/117.3 |
| 4,492,112 A | 1/1985 | Igarashi et al. ............. | 73/117.3 |
| 4,697,459 A | 10/1987 | Nonomura et al. ........ | 73/862.36 |
| 4,899,596 A | 2/1990 | Janik et al. ............... | 73/862.33 |
| RE33,450 E | 11/1990 | Manzolini .............. | 364/431.03 |
| 5,226,323 A | 7/1993 | Wakayama ................. | 73/117.3 |
| 6,226,585 B1 * | 5/2001 | Cullen .......................... | 701/54 |
| 6,278,925 B1 | 8/2001 | Wozniak ...................... | 701/54 |
| 6,389,363 B1 | 5/2002 | Marcheguet et al. .......... | 702/41 |
| 6,401,527 B1 | 6/2002 | Langer ..................... | 73/117.3 |
| 2001/0021893 A1 | 9/2001 | Weisman, II ................ | 701/114 |
| 2003/0176257 A1 * | 9/2003 | Matsumura et al. ......... | 477/115 |

\* cited by examiner

*Primary Examiner*—Sherry L Estremsky
*Assistant Examiner*—Edwin A. Young
(74) *Attorney, Agent, or Firm*—Patrick M. Sheldrake; Michael G. Harms

(57) ABSTRACT

A method for real time determination of a base torque value, representative of maximum available torque of an engine at a specified engine rpm, as a function of engine torque during predetermined engine conditions. The base torque value is used to determine shift points for an automatic transmission of an self propelled work machine.

17 Claims, 2 Drawing Sheets

AUTOMATIC CALIBRATION OF A TORQUE MEASURING SYSTEM

TECHNICAL FIELD

This invention relates generally to real time determination of shift points for an automatic transmission of a self propelled work machine, and more particularly, to a method of determining information representative of maximum available torque at a specified engine rpm that is dynamic and may change responsive to conditions such as changes in engine characteristics, for use in determining optimum automatic transmission shift points for a vehicle such as a work machine, and in particular, a tractor for agricultural and other uses.

BACKGROUND ART

As the use of fully automatic transmissions becomes more widespread in vehicles such as work machines used for a variety of purposes, and particularly, in self propelled work machines, such as, but not limited to, tractors, combines, and the like, a need has been identified for better methods for determining appropriate and/or more optimal shift points for the transmissions. Although strategies for use in determining automatic transmission shift points for automobiles have been available for some time, it has been found that such strategies are generally not suitable for work machines, since the engines of work machines typically employ governors. In particular, when a governor is employed, the operator positions the throttle to obtain a desired engine speed, and the governor responsively controls the engine torque to maintain that speed. Therefore, for a governor controlled engine, throttle position is not a good indicator of torque.

It is known to utilize a torque sensor for sensing torque output of an engine. However, for the present purposes, that is, optimization of shift points of an automatic transmission under dynamic conditions, a torque sensor, by itself, does not provide enough information. Additionally, knowledge of the maximum available torque at a specified engine rpm is required. The torque output capability of a particular model of engine produced for a model line of work machines, can be designated and set forth in a specification for the engine, but, in practice, may vary significantly for each actual engine produced. This variance can be the result of a variety of factors, such as, but not limited to, build quality of a particular engine. Even for a particular engine, the torque output capability can change over time, also as a result of a variety of factors, which can include, but are not limited to, engine break-in, frequency of lubricant changes, quality and grade of lubricant, air and lubricant filter condition, fuel quality and water content, and severity of environmental and operating conditions. As an example, during one episode of operation, a poor quality fuel may be used, followed by an episode wherein a higher quality of fuel is used, such that the available torque output of the engine improves from the first to the second episode. As another example, it may be desirable to set an initial value representative of available torque to a relatively low value, such as during an initial break-in period when the engine and/or transmission is new, such that transmission shift points can be correspondingly set low and loading conditions on the engine transmission are reduced, then increasing the value representative of available torque, for instance, over time, as the engine and transmission are broken in and the capability thereof is increased, and to thereby increase the loading conditions that can be exerted on the engine and transmission.

Reference in this regard, Igarashi et al., U.S. Pat. No. 4,492,112, which discloses a method of determining optimum shift positions for an automatic transmission, which method involves looking up stored data in an engine torque search map for determining each shift. However, a shortcoming of this method is that it uses only static data, which is actually only a predetermined estimate of available torque, and may vary considerably from actual available torque, for the reasons set forth above.

It is therefore desirable to provide a method to determine the available engine torque in real time, representative of engine characteristics for use in determining automatic transmission shift points that can be utilized in a variety of vehicles that will adjust to variations in manufacturing tolerances, changes in the engine due to break in, wear, and the like, and variations in operating conditions, such as variations in quality of fuel, and the like. Thus, what is sought is an adaptive, dynamic method to determine available engine torque, in real time, for an engine for use in determining optimal automatic transmission shift points which overcomes at least one of the problems, shortcomings or disadvantages set forth above.

SUMMARY OF THE INVENTION

What is disclosed is an adaptive, dynamic method to determine available engine torque, in real time, for an engine for use in determining optimal automatic transmission shift points which overcomes at least one of the problems, shortcomings or disadvantages set forth above.

According to a preferred aspect of the invention, a method for determining a shift point of an automatic transmission of a self propelled vehicle having an engine controlled by a governor is provided. A torque sensor operable for sensing actual torque output of the engine and outputting information representative thereof is provided in connection with a control system which receives the output information. The control system is automatically operable for monitoring the information representative of actual torque output during the operation of the engine when the engine is operating under at least one predetermined operating condition. A base torque value (BTV) representative of a maximum available torque of the engine at a specified rpm is determined as a function of the monitored actual torque output. Then the shift point for the automatic transmission is determined as a function of the base torque value. In this method an initialized BTV is updated, when necessary, as a function of actual engine torque available during a predetermined length of time when the engine is run above a predetermined speed and predetermined loading conditions.

The BTV can be initialized to a predetermined value during the first operating session of the engine, and in subsequent operating sessions of the engine, the BTV can be initialized as a function of the BTV determined in the previous session. Additionally, the previous BTV may be used to set a minimum BTV for subsequent operating sessions of the engine.

In some situations the self propelled work machine engine is run at low speed and/or low torque conditions over an extended period of time. To accommodate for variations in engine performance that may occur during this interval, the BTV can be initialized to the BTV of the previous engine operating session less a predetermined amount. Once the engine is run at the predetermined speed and loading conditions, the BTV will be updated to reflect the present engine performance.

As a result of the invention, automatic transmission shift points are optimized because they are determined and updated in real time as a function of real time variations in engine performance.

DETAILED DESCRIPTION OF THE INVENTION

Figure 1:
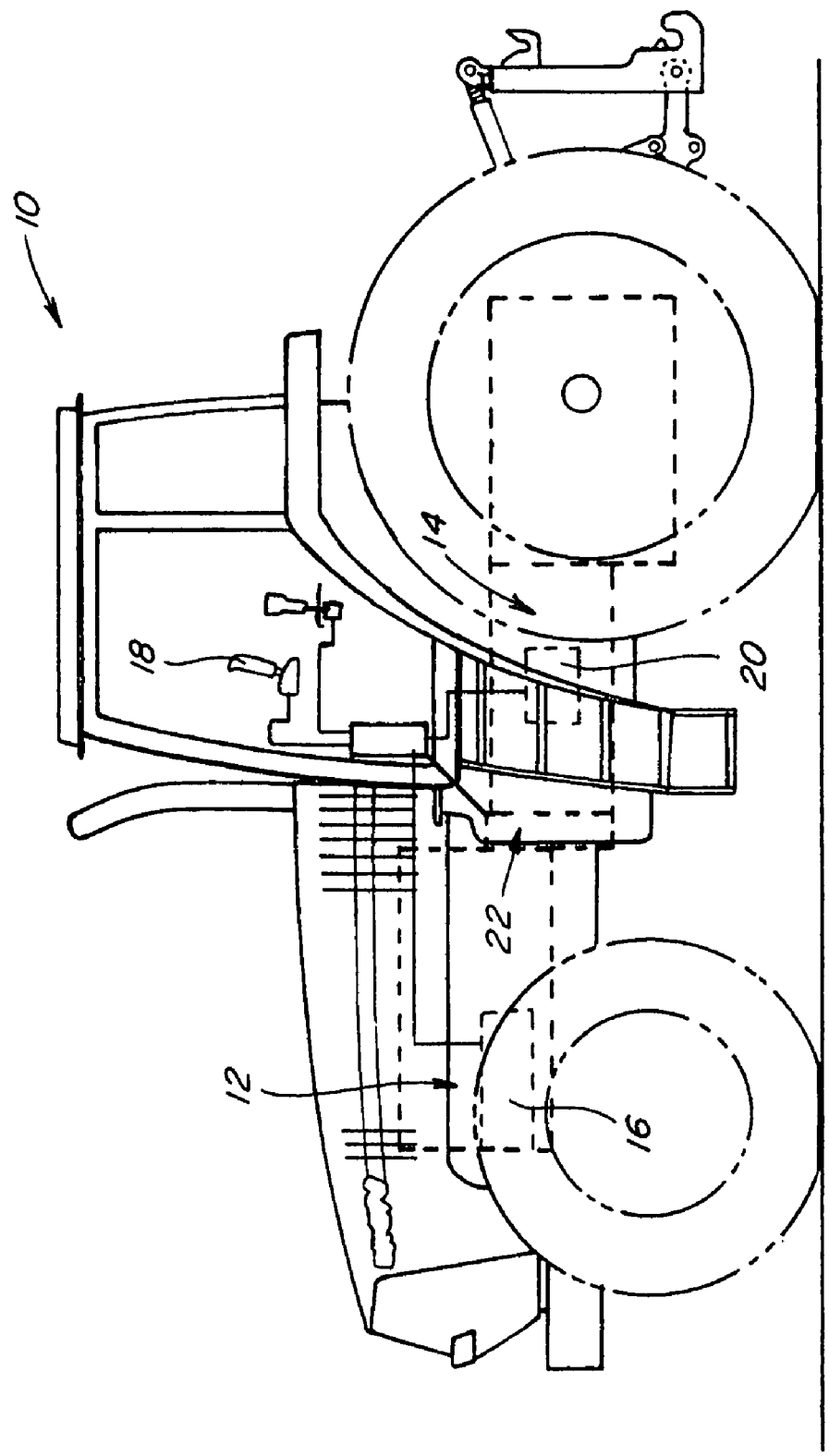
FIG. 1 is a simplified side view of a tractor.

Referring now to the drawings, wherein like numbers refer to like parts, FIG. 1 shows a simplified side view of a tractor 10 including an engine 12 and an automatic transmission 14. Tractor 10 is representative of a tractor with a full powershift transmission, but it should be understood that it is contemplated that the invention can likewise be used with other types of self propelled vehicles equipped with an automatic transmission. Engine 12 includes a governor 16 that adjusts engine torque to maintain an engine speed corresponding to a throttle 18 position, and a controller 20 controls engine 12 and transmission 14 in a well known manner. When determining automatic transmission shift points, it is advantageous to use a ratio of current engine torque versus a maximum available engine torque at the specified engine rpm. Since governor 16 adjusts engine torque to maintain the engine speed corresponding to the position of throttle 18, throttle 18 position is not a good indicator of current engine torque. Instead, engine torque may be computed based on available information, or tractor 10 may be equipped with a torque sensor 22 that provides engine torque information to controller 20.

It is well known that the ratio of the actual engine torque output to the maximum available engine torque output at a specified engine rpm is a major factor in determining optimum shift points for automatic shifting. However, the maximum available engine torque at a specified engine rpm typically varies from the torque output capability designated in a specification for the engine. This variance can be the result of a variety of factors, such as, but not limited to, build quality of a particular engine. In addition, the torque output capability of an engine can change over time, also as a result of a variety of factors, which can include, but are not limited to, engine break-in, frequency of lubricant changes, quality and grade of lubricant, air and lubricant filter condition, fuel quality and water content, and severity of environmental and operating conditions. Due to the resultant possible variations in available engine torque between similar engines and during the lifetime of a particular engine, use of the manufacturer specified torque output capability has been observed to produce less than optimum automatic transmission shift points.

Figure 2:
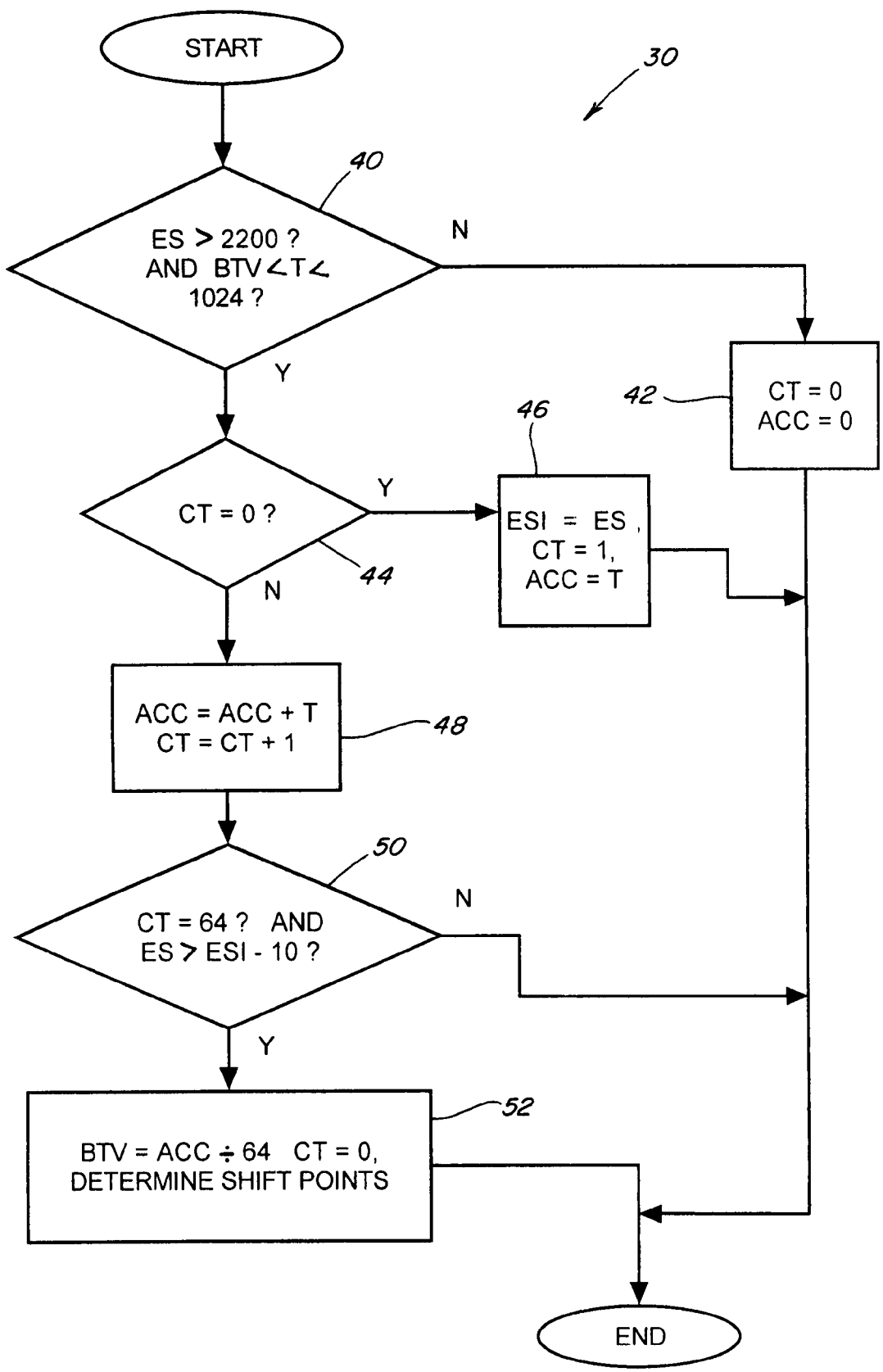
FIG. 2 is a logic flow diagram depicting a preferred embodiment of the invention.

Referring also to FIG. 2, a flow diagram 30 illustrating steps of a method of the invention for determining optimized automatic transmission shift points in real time incorporating sensitivity to the dynamic variations in engine output torque capability is provided. The method of the invention provides real time automatic determination of shift points for an automatic transmission of a self propelled work machine, for example, tractor 10, including a control system or systems realized within controller 20 operational for controlling the operation of engine 12 and the shifting of transmission 14 of tractor 10. According to the method engine 12 torque values are monitored during engine operation, and a base torque value (BTV) representative of a maximum available torque of the engine at the specified engine rpm is determined as a function of a predetermined number of torque values of engine 12 monitored during predetermined engine 12 conditions. Automatic transmission shift points are determined as a function of BTV. Since BTV is dynamically updated, the method dynamically updates automatic transmission shift points for engine 12 independent of tractor 10 model type, or variations in engine 12 build quality. Real time determination of automatic transmission shift points optimizes shifting based on engine 12 as its capability varies. As engine 12 breaks in, the maximum output torque available at the specified engine rpm may increase creating a corresponding increase in BTV. As engine 12 wears or various factors degrade the performance of engine 12, BTV will be adjusted accordingly by the method of the invention. Because BTV is used in determination of transmission shift points on an ongoing basis, the shift points will be dynamically updated in real time according to the capability of engine 12.

FIG. 2 presents a preferred embodiment of the method of the invention for updating automatic transmission shift points as a function of BTV. Because BTV is representative of available engine 12 torque, the method evaluates and updates BTV, if necessary, at relatively high engine 12 speed and loading conditions to determine an indicator of maximum available torque at the specified engine rpm. It is believed that it is better to base BTV on the steady state available torque at rated engine speed rather than peak torque. However, a small error in setting the high idle speed of engine 12 can reduce torque available at rated speed by a large amount. Therefore the method determines BTV at a somewhat lower speed of engine 12. According to one preferred aspect of the invention, BTV is initialized to an assumed low value, and then increased as actually determined engine torque exceeds the BTV during operation of engine 12.

For clarity FIG. 2 is directed to tractor 10, which by way of example is a typical tractor model having a specification that designates and sets forth a rated engine speed of 2300 revolutions per minute (rpm). A selected maximum torque output available at a somewhat lower engine speed of about 2200 rpm is used, although another speed could be selected if better for a particular application. At this speed for the designated engine, a maximum torque output can be expected to range from about 350 to 550 Newton-meters (Nm). This range illustrates the wide range within which the actual available torque may reside. In addition, for purposes of this example, controller 20 is assumed to have a background loop time of 0.01 second. A decision block 40 compares a current speed (ES) of engine 12 to a predetermined threshold speed, 2200 rpm in this example, which is somewhat less than the rated speed of engine 12. Decision block 40 also compares an actual torque T of engine 12 to the initialized or previous value of the BTV. To ignore transient values or sensor anomalies and to prevent mathematical overflows, and the like, actual torque T is also compared to a very high value, 1024 in this example. If engine speed ES and actual torque T are below the threshold values, a counter CT and an accumulator ACC are zeroed at block 42. If engine speed ES is above the threshold speed and actual torque T is above the previous BTV, actual torque T is stored for a possible update to BTV. A decision block 44 checks the value of counter CT to determine if this is the initial pass in which engine speed ES and actual torque T are above the threshold values. On the first pass, engine speed ES is stored as an initial engine speed ESI, counter CT is incremented from zero to one, and accumulator ACC is initialized to the value of actual torque T at a block 46.

If engine 12 continues to run at relatively high speed and load, then engine speed ES and actual torque T continue to exceed the threshold speed and BTV respectively. During these conditions, accumulator ACC is increased by the value of actual torque T and counter CT is incremented at a block 48 during subsequent passes through flow diagram 30. After a predetermined length of time, 0.64 seconds or 64 passes in this example, during which engine speed ES has remained relatively constant, within 10 rpm in this example, as compared in a decision block 50, BTV is updated at a block 52 as an average of the values representative of measured/actual torque T during the continuous period of time in which engine speed ES exceeded threshold speed and actual engine torque T was greater than BTV. A relatively constant engine speed is desirable to avoid transients in engine torque which may occur, for example, if the load on tractor 10 suddenly increases, causing engine speed to drop rapidly as energy is released from the flywheel and other rotating parts, resulting in high torque for a short period of time. Based on updated BTV, optimized automatic transmission shift points are also determined at block 52.

The method described hereinabove may eliminate or reduce the need for manual setup when engine 12 is installed in tractor 10. The initial BTV may be set conservatively low, and updated corresponding to available engine torque simply by running engine 12 at or near full speed and full load briefly. In addition, BTV can be stored at the end of an operating session of tractor 10 and used to initialize BTV during the next operating session of tractor 10.

Another advantage of the invention is that accommodating changes in engine 12 performance over time may be accomplished even when engine 12 is repeatedly used in low speed, low torque applications. For such applications, according to one aspect of the invention the initialized value of BTV is decremented by a predetermined amount during each operating session in which tractor 10 is utilized without reaching engine speed and torque thresholds. Once engine 12 is run at high speed and torque values, the method of the invention will automatically update BTV to a value representative of available torque for present engine 12 characteristics and conditions.

Using the method of the invention automatic transmission shift points are updated automatically in real time during full load, full speed operation, which is a common operating mode. The method determines BTV which is very near the maximum available steady state torque at rated engine speed for determination of optimized automatic transmission shift points which are sensitive to changes in engine 12 characteristics and performance.

As is thus evident from the above description, an advantage of the method of the invention is that an accurate, real time BTV is always present. This enables computing optimized transmission shift points representative of actual engine characteristics. Thus, an engine and/or transmission control system can be configured to always provide accurate, optimized shift points for a particular engine under existing conditions, such as fuel quality, break in status, environmental condition, and the like, without relying of predetermined values such as would be found in a look up table, that may or may not reflect actual engine capabilities.

It will be understood that changes in the details, materials, steps, and arrangements of parts which have been described and illustrated to explain the nature of the invention will occur to and may be made by those skilled in the art upon a reading of this disclosure within the principles and scope of the invention. The foregoing description illustrates the preferred embodiment of the invention; however, concepts, as based upon the description, may be employed in other embodiments without departing from the scope of the invention. Accordingly, the following claims are intended to protect the invention broadly as well as in the specific form shown.

What is claimed is:

1. A method for determining a shift point of an automatic transmission of a self propelled vehicle having an engine controlled by a governor, comprising the steps of:
   providing a torque sensor operable for sensing actual torque output of the engine and outputting information representative of the actual torque output;
   providing a control system connected to the torque sensor for receiving the information representative of the actual torque output, the control system being automatically operable for monitoring the information representative of actual torque output in real time during the operation of the engine when the engine is operating under at least one predetermined operating condition and determining a base torque value representative of a maximum available torque of the engine at a specified engine rpm as a function of the monitored actual torque output; and
   determining the shift point for the automatic transmission as a function of the determined base torque value.

2. The method of claim 1, wherein determining the base torque value comprises the steps of:
   initializing the base torque value to a predetermined value;
   monitoring an engine speed;
   storing information representative of the engine torque when the engine speed is greater than a predetermined engine speed and the engine torque is greater than the base torque value;
   computing an average engine torque value as a function of the information representative of the engine torque stored during a predetermined length of time; and
   updating the base torque value to the average engine torque value when the engine speed remains within a predetermined range during the predetermined length of time.

3. The method of claim 2 wherein the initial base torque value is a function of the base torque value determined in a previous operating session of the self propelled vehicle.

4. The method of claim 2 wherein the initial base torque value is limited to a minimum base torque value.

5. The method of claim 1 wherein the at least one predetermined operating condition is related to an engine specification.

6. A method for real time automatic determination of shift points for an automatic transmission of a self propelled work machine, comprising the steps of:
   providing an engine in connection with a governor operable to adjust a torque output of the engine to maintain an operator requested speed;
   providing a control system operational for controlling operation of the engine and shifting of the automatic transmission of the self propelled work machine;
   monitoring, in real time, a speed of the engine and the torque output of the engine;
   automatically determining a base torque value representative of a maximum available torque of the engine at a specified engine rpm as a function of the monitored torque output when the engine is operating within a predetermined speed range and a predetermined output torque range; and
   automatically determining the shift points for the automatic transmission as a function of the base torque value.

7. The method of claim 6 wherein determining the base torque value comprises the steps of:
   initializing the base torque value to a predetermined value; and when the speed of the engine is greater than a predetermined engine speed, and when the torque output of the engine is greater than the base torque value;

storing information representative of the torque output and the speed and incrementing a counter;

when the counter is incremented to a predetermined value, and when the stored information representative of engine speed is within a predetermined tolerance;

updating the base torque value to an average torque output of the stored information representative of the torque output.

8. The method of claim 7 wherein the initial base torque value is a function of the base torque value determined in a previous operating session of the self propelled work machine.

9. The method of claim 7 wherein the initial base torque value is limited to a minimum base torque value determined as a function of the base torque value determined in a previous operating session of the self propelled work machine.

10. The method of claim 7 wherein the initial base torque value and the predetermined engine speed are related to an engine specification.

11. The method of claim 7 wherein the information representative of engine torque and engine speed is stored when the engine speed is greater than the predetermined engine speed and the engine torque is between the base torque value and a predetermined base torque value limit.

12. A method of real time automatic determination of shift points for an automatic transmission of a vehicle including an engine wherein a governor adjusts an engine output for maintaining a selected input parameter, comprising the steps of:

providing a control system operational for controlling operation of the engine and shifting of the transmission of the vehicle;

monitoring engine torque values in real time;

automatically determining a base torque value representative of a maximum available torque of the engine at a specified engine rpm as a function of a predetermined number of consecutive engine torque values monitored during operation of the engine when the engine is operating under at least one predetermined condition; and determining the shift points of the automatic transmission as a function of the base torque value.

13. The method of claim 12, wherein determining the base torque value comprises the steps of:

initializing the base torque value to a predetermined value;

monitoring an engine speed;

storing information representative of the engine torque when the engine speed is greater than a predetermined engine speed and the engine torque is greater than the base torque value;

computing an average engine torque value as a function of the information representative of the engine torque stored during a predetermined length of time; and updating the base torque value to the average engine torque value when the engine speed remains within a predetermined range during the predetermined length of time.

14. The method of claim 13 wherein the base torque value is initialized as a function of the base torque value determined in a previous operating session of the vehicle.

15. The method of claim 13 wherein the base torque value is initialized to a minimum base torque value.

16. The method of claim 13 wherein the initial base torque value and the predetermined engine speed is related to an engine specification.

17. The method of claim 13 wherein the information representative of engine torque is stored when the engine speed is greater than the predetermined engine speed, and the engine torque is between the base torque value and a predetermined base torque value limit.

* * * * *